(12) United States Patent
Magnusson

(10) Patent No.: US 12,195,141 B2
(45) Date of Patent: Jan. 14, 2025

(54) SYSTEM FOR RETRIEVAL OF OBJECTS LOST IN WATER

(71) Applicant: CMAR AB, Västra Frölunda (SE)

(72) Inventor: Christian Magnusson, Västra Frölunda (SE)

(73) Assignee: CMAR AB, Västra Frölunda (SE)

( * ) Notice: Subject to any disclaimer, the term of this patent is extended or adjusted under 35 U.S.C. 154(b) by 443 days.

(21) Appl. No.: 17/768,284

(22) PCT Filed: Oct. 20, 2020

(86) PCT No.: PCT/SE2020/051009
§ 371 (c)(1),
(2) Date: Apr. 12, 2022

(87) PCT Pub. No.: WO2021/080487
PCT Pub. Date: Apr. 29, 2021

(65) Prior Publication Data
US 2023/0098899 A1 Mar. 30, 2023

(30) Foreign Application Priority Data
Oct. 22, 2019 (SE) .................................. 1930342-9

(51) Int. Cl.
*B63B 22/12* (2006.01)
*B63C 7/26* (2006.01)
*A01K 69/08* (2006.01)

(52) U.S. Cl.
CPC ................ *B63B 22/12* (2013.01); *B63C 7/26* (2013.01); *A01K 69/08* (2013.01)

(58) Field of Classification Search
CPC ............ B63B 22/12; B63C 7/26; A01K 69/08
See application file for complete search history.

(56) References Cited

U.S. PATENT DOCUMENTS 2,903,718 A * 9/1959 Wright, Jr. .............. B63B 22/08
116/210
4,262,379 A 4/1981 Jankiewicz
(Continued)

FOREIGN PATENT DOCUMENTS

CN 101973377 A 2/2011
CN 204623393 U 9/2015
(Continued)

OTHER PUBLICATIONS

CMAR AB, International Patent Application No. PCT/SE2020/051009, International Search Report, Dec. 22, 2020.
(Continued)

*Primary Examiner* — S. Joseph Morano
*Assistant Examiner* — Jovon E Hayes
(74) *Attorney, Agent, or Firm* — Moore & Van Allen PLLC; W. Kevin Ransom

(57) ABSTRACT

A system for retrieval of objects submerged and lost in water is disclosed. The system comprises a gas release cartridge, an activation assembly arranged for activation of the gas release cartridge in response to at least one of: lapse of time, pressure, trigger-wire, indirect water contact, or remote acoustic command or any combination thereof, components of which are all contained in an inflatable bladder. A guide line, one end thereof attached to the bladder and the other end connectable to the object, is housed inside a non-watertight casing together with the inflatable bladder.

19 Claims, 4 Drawing Sheets

(56) References Cited

U.S. PATENT DOCUMENTS

| | | | | |
|---|---|---|---|---|
| 4,721,486 A | * | 1/1988 | Goettel | B63C 7/26 |
| | | | | 251/294 |
| 2011/0078938 A1 | * | 4/2011 | Aguzin | A01K 87/007 |
| | | | | 43/25 |
| 2012/0231685 A1 | * | 9/2012 | Fisher | B63B 22/12 |
| | | | | 441/2 |
| 2013/0210297 A1 | | 8/2013 | Maas et al. | |
| 2013/0247892 A1 | * | 9/2013 | Blackman | B63C 9/081 |
| | | | | 124/71 |
| 2016/0340001 A1 | * | 11/2016 | Welch | B63B 22/22 |
| 2017/0029081 A1 | * | 2/2017 | Michalski | F17C 1/00 |

FOREIGN PATENT DOCUMENTS

| | | |
|---|---|---|
| CN | 207078292 U | 3/2018 |
| WO | 9107311 A1 | 5/1991 |

OTHER PUBLICATIONS

CMAR AB, International Patent Application No. PCT/SE2020/051009, Written Opinion, Dec. 22, 2020.

\* cited by examiner

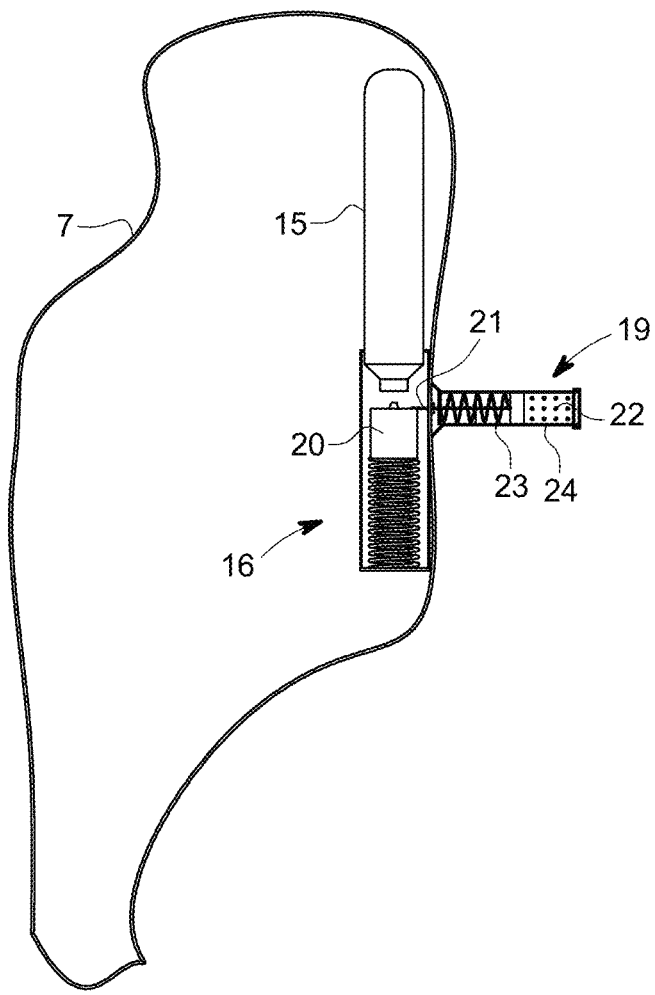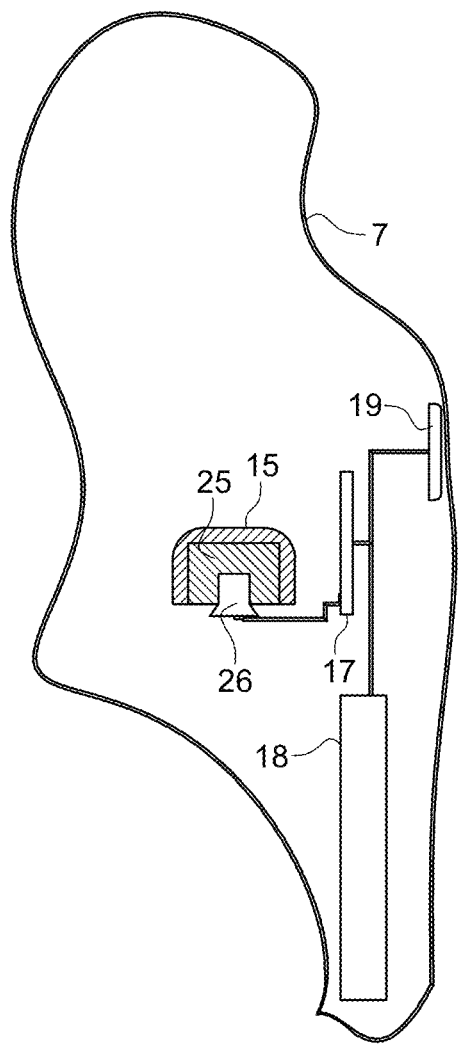
Fig. 4
Fig. 5

SYSTEM FOR RETRIEVAL OF OBJECTS LOST IN WATER

CROSS-REFERENCE TO RELATED APPLICATIONS

This application is a National Stage Patent Application (filed under 35 § U.S.C. 371) of PCT/SE2020/051009, filed Oct. 20, 2020 of the same title, which, in turn claims priority to Swedish Patent Application No. 1930342-9 filed Oct. 22, 2019 of the same title; the contents of each of which are hereby incorporated by reference.

FIELD OF THE INVENTION

The present invention relates to a system built on components which are designed and configured to provide retrieval and optionally to facilitate recovery of an object that has been submerged and lost in water.

BACKGROUND OF THE INVENTION

The retrieval system of the present invention is particularly useful for marking the position of an object, such as fishery equipment, e.g., which has unintentionally broken adrift and eventually sunk to the bottom of the sea, or fishery equipment, such as lobster or crab traps, placed on the sea bottom where a buoy, which is marking the position floating on the sea surface and connected to the fishery equipment with a line, has been punctured or raptured.

Fishery equipment which is lost at sea represents a great economical loss and causes unnecessary death among fish since the equipment continues to catch fish for a long time after it has been lost. The magnitude of the problem is readily understood, considering that abandoned, lost or disposed fishing gear accounts for about one third of all marine litter found in European seas, or over 11.000 tons per year. The magnitude of the problem is further readily understood, considering that for the Baltic Sea alone it is estimated that 1000 km of lost or abandoned fishing nets are believed to catch 300 tons of cod yearly.

For compliance with EU Regulation 1224/2009, a loss of fishery equipment at sea must be reported to the relevant authorities within 24 hours. It is however difficult to locate and recover lost fishery equipment which is a major problem, and there is still need for reliable technology to solve that problem.

In prior art, use of a floating buoy for marking the position of a submerged or sunken object is a known method which is previously disclosed in the literature, for examples see, inter alia, WO91/07311, US2011/0078938A1, U.S. Pat. Nos. 4,721,486 and 2,903,718.

Among those listed, U.S. Pat. No. 4,721,486 discloses a marker buoy device comprising an inflatable bladder, a gas container and a tethering line supported on the outside of a watertight housing which contains a control and release mechanism. A differential pressure sensing switch is arranged in the housing to initiate inflation and release of the bladder as soon as the housing is lowered into water, upon which the switch reacts to the difference in pressure between external water and the internal pressure inside the watertight housing.

Once located, however, the recovery of drifting or sunken objects may still be a difficult task usually requiring grappling or the work of divers to attach a recovery line to the sunken object.

SUMMARY OF THE INVENTION

It is an object of the present invention to provide a system for retrieval of an object, such as a floating object which has been lost and is drifting freely in the water, or an object which is submerged to the sea bottom, such as a lobster or crab trap or other submerged fishery equipment which is placed on the sea bottom in normal use and wherein a buoy is marking the position floating on the sea surface and connected to the fishery equipment with a line.

In one aspect, the invention aims to provide a marking buoy and inflation mechanism which is well protected in standby mode and reliable in operation.

In another aspect, the invention aims to provide guidance and a coupling interface for recovery equipment by which the lost object can be lifted to the surface.

Briefly, a system for retrieval of objects submerged and lost in water comprises an inflatable bladder; a gas release cartridge installed in the bladder; an activation assembly installed in the bladder and arranged for activation of the gas release cartridge in response to at least one of: indirectly detected water pressure, sensed conductivity or capacitance internally of the bladder, pulling of a trigger-wire, or received remotely sent acoustic command or any combination thereof, and a guide line one end of which is attached to the bladder and the other end being connectable to the object.

In standby mode, the components of the retrieval system are housed in a non-watertight casing which allows the surrounding water to act indirectly on sensors arranged inside the bladder.

In the present invention, activation of the retrieval system and release of the bladder is delayed for a period of time which is longer than the expected time of operation of an object in submerged state, in its normal use. This is accomplished through a timer function that is triggered to start counting as the retrieval system is submerged, and which can be reset to zero if the object and system is taken out of the water within a predetermined time period.

An advantageous embodiment of the system comprises an inflatable bladder in inflated state forming a marker buoy; a gas release cartridge installed inside the bladder; a gas release mechanism installed inside the bladder and operable to release gas from the gas release cartridge; a control circuit installed inside the bladder and arranged to activate the gas release mechanism in response to an activation signal; an initiation device arranged for activation of the control circuit in response to at least one of: indirectly detected water pressure, sensed conductivity or capacitance internally of the bladder or by means of pulling of a trigger-wire, or received remotely sent acoustic command or any combination thereof; a guide line, one end thereof connectable to the object and the other end attached to the bladder, the guide line having a length sufficient to reach from the submerged object to the inflated bladder when floating on the surface as a marker buoy.

The components of the retrieval system are in standby state protected inside a non-watertight casing, such that upon inflation the casing is opened by the expanding bladder.

The initiation device is arranged to trigger a timer function in the control circuit which can be set to generate the activation signal or activate the control circuit after a predetermined lapse of time, and the timer function is arranged to be reset so as to deactivate the retrieval system within the predetermined lapse of time in the course of normal operation.

One technical effect achieved is that all components which are active in the inflation and release of the marker buoy are protected inside the bladder.

Since the bladder is inflatable and the above-said components are installed inside the bladder and the guide line can be folded or winded, the system according to the invention can be made compact. A guide line storage can be housed and protected inside the casing, whereas an end of the guide line may reach out from the casing for attachment to the object.

The system is installed in a non-watertight outer casing which can be attached to the object or to a separate member connectable to the object. The casing is arranged to release the marker buoy in response to inflation of the bladder. To this purpose, the casing can be formed with an indication of fracture, e.g., or may comprise a releasable closing mechanism such as a snap-lock arrangement.

In one embodiment, the system comprises a catcher member attached to the object and arranged to be engaged by a recovery means in a retrieval operation. The guide line may be alternatively arranged to engage, directly or indirectly, a catcher member in preparation for engagement with a grapnel or other recovery mean. In one embodiment, the guide line can be arranged to run underneath the catcher member so as to lift the catcher member as the bladder rises to the surface under tensioning of the guide line.

The catcher member can be a wire, a band or a rope, e.g., or a railing being pivotally attached to the object. The catcher member can be raised to coupling position by engagement with the guide line, running underneath the wire, band, rope or railing, as the inflated bladder is rising to the surface, or as the guide line is being stretched in a retrieval operation. In yet another embodiment, the catcher member can be made of a self-buoyant material that rises automatically to coupling position upon activation of the system.

A technical effect and advantage of this embodiment is that coupling between the object and a recovery means, such as a grapnel or other hooking tool with associated recovery line, is facilitated.

In one embodiment the system comprises a line follower which is pre-installed for sliding on the guide line. The line follower can be detachably connected to the bladder. The line follower can be of cylinder shape. A coupling eye formed in a bracket can be arranged on the exterior of the line follower. The line follower can be made of buoyant material, or designed with a hollow interior for buoyancy.

A technical effect and advantage of this embodiment is that a recovery means, such as a grapnel or other hooking tool with associated recovery line, can be effectively guided towards the object from a surface vessel.

In one embodiment of the system, an initiation device comprises a timer or timer function. In another embodiment, an initiation device comprises a pressure sensor. In yet another embodiment an initiation device comprises an indirect water detection sensor/switch (consisting of a conductivity and/or a capacitance sensor/switch). The pressure sensor or conductivity/water detection sensor/switch may start the timer or timer function as the bladder comes in contact with water entering into the non-watertight casing. In still another embodiment, an initiation device comprises an acoustic modem responsive to an acoustic signal that is transferred through the water. In another embodiment, an initiation device comprises a trigger-wire which starts the timer or activates the gas release mechanism in response to rupture of the trigger-wire in connection with breaking adrift from a float or from a drifting/sinking object.

Each of these embodiments of the initiation device provides different technical effects and advantages: the timer permits activation and de-activation of the system on objects which are frequently submerged and then brought to the surface in normal operation, such as fishery equipment e.g.; the pressure sensor may be a passive safety function for objects which are unintentionally submerged, such as surface vessels or cargo containers e.g.; the acoustic modem permits marking and retrieval of a submerged object on demand.

In one embodiment of the system, an initiation and triggering device comprises at least one of: a wireless device, a switch, such as an electro-mechanical or a magnetic switch, a pressure sensor, a water detecting conductivity and/or capacitance sensor or an acoustic modem, and arranged for generation of a signal to activate the timer or time delay function installed inside the bladder.

In one embodiment of the system, the timer or timer function is arranged in the control circuit or in a microprocessor of the control circuit.

In one embodiment of the system, the lapse of time realized by means of the timer or timer function may be a superordinate activation mechanism over any other activation mechanism mentioned in this application for activation of the gas release mechanism.

In one embodiment of the system, the bladder carries a material of high visibility such as a luminous or light reflective material or a radar reflective material. In one embodiment, the bladder carries a transponder.

Each of these embodiments facilitate finding and retrieval of the bladder/marker buoy and the lost object in daylight or darkness. In other embodiments the bladder carries printed or electronic information about the lost object and information on how to contact the owner. Other information of importance, such as how to recover the object or correctly handle the object when recovered from the sea, is advantageously included in the printed or electronic information.

BRIEF DESCRIPTION OF THE DRAWINGS

Embodiments of the invention will be more closely described below with reference made to the accompanying, schematic drawings, of which:

FIG. 4 shows an alternative activation assembly for activation of the retrieval system in one embodiment of the present invention, FIG. 5 shows yet an alternative activation assembly for activation of the retrieval system in one embodiment of the present invention.

DETAILED DESCRIPTION OF THE INVENTION

Figure 1:
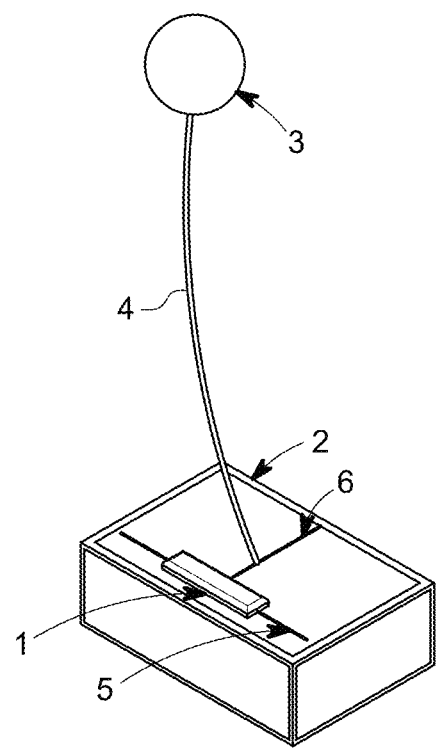
FIG. 1 shows an object in submerged state having a float tethered to it.

With reference to FIG. 1, the components of a retrieval system in accordance with the present invention is in standby state protected inside an outer casing 1 which can be attached to an object 2 that is intended to be submerged in water, such as fishery equipment for example, or to an object which runs the risk of being unintentionally submerged and sunk to the bottom of the sea, such as a surface vessel or a cargo container.

For purpose of illustration, the object is here represented by a lobster trap which is tethered to a float 3 via a tethering rope 4. In this connection it serves to underline that the outer casing 1 with its content, as will be described below, have little or no impact on the buoyancy of the object 2.

The casing 1 can be realized as a box made of corrosion resistant material, such as stainless steel or plastic, e.g. As will be understood from the rest of the disclosure, the casing 1 is arranged to let water enter into the casing when the casing is submerged. In this aspect, the casing 1 is a non-watertight shell.

In FIG. 1, reference number 5 refers to a catcher being an operative member of the retrieval system of the present invention as will be more closely explained below. Further in FIG. 1, reference number 6 refers to a guide line which is another operative component of the system.

Figure 2:
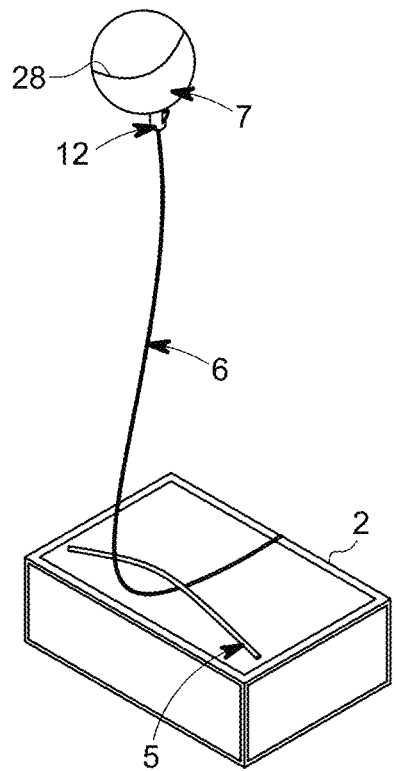
FIG. 2 shows the object of FIG. 1 without the float and after activation of the retrieval system of the present invention.

FIG. 2 shows the retrieval system in activated state where by way of example the fishing gear floater and tethering rope have been lost. The outer casing 1 (not shown in FIG. 2) has been burst open or disconnected upon inflation of an inflatable bladder 7, in inflated mode forming a marker buoy, which rises to the surface while being anchored to the object 2 via the unfolding/unwinding guide line 6. Upon activation, the catcher 5 is set in position ready for coupling to a recovery means, such as a grapnel or similar hooking tool.

Setting the catcher 5 in the coupling ready position can be accomplished when, as illustrated in FIG. 2, the guide line 6 is arranged to run underneath the catcher 5 while one end 8 (see FIG. 3) of the guide line is anchored to the object. In this embodiment the catcher 5 may be realized as a flexible wire which is raised from the object as the guide line unwinds/unfolds through the motion of the rising bladder. The catcher may also raise from the object when the guide line is stretched in connection with a retrieval operation. In another embodiment, the catcher 5 may be realized in the form of a springy band or a rope having buoyancy which rises from the object in response to disconnection (or bursting open) of the outer casing 1 upon activation of the retrieval system. In all alternatives the catcher can be seen forming a loop effective for engagement by a grapnel or similar kind of hook.

Figure 3:
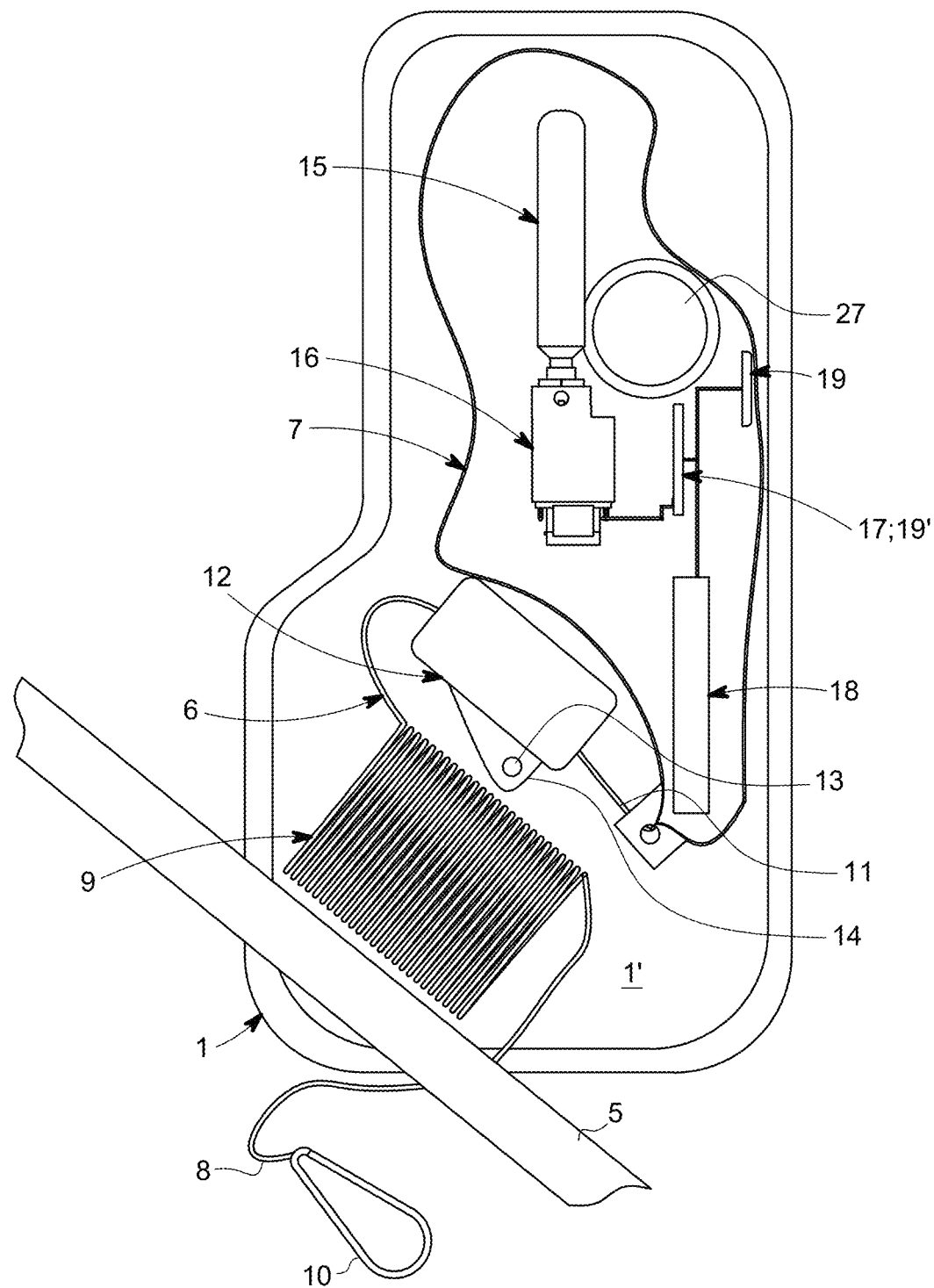
FIG. 3 shows the components of the retrieval system of one embodiment of the present invention in standby state.

The components of the retrieval system shall now be more closely described with reference to FIG. 3, showing the system in standby state. Protected inside the outer casing 1, a wall of which is removed for visibility, is the bladder 7 in non-inflated condition and the guide line 6. The length of the guide line 6, which is adapted to the prevailing depths of water, is folded or wound for storage 9 in the casing. End 8 of the guide line 6 is arranged for attachment to the object, such as through tying, e.g., or via a coupling means such as a snap link 10, whereas the other end 11 of the guide line 6 is connected to the bladder 7. The guide line 6 can be made thin and thus the storage 9 made compact. The guide line or at least the storage 9 is preferably arranged inside the casing, but may alternatively be arranged at least partly outside the outer casing 1.

A line follower 12 can be detachably arranged to the bladder 7 in order to rise to the surface underneath the inflated bladder/marker buoy. The line follower 12 can be of hollow design, made of low-density material, or buoyant material, such as cork or cell foam, so as to rise to the surface underneath the bladder, also without being coupled to the bladder if appropriate. The line follower may be of cylinder shape. An eye 13 formed on a bracket 14 provides connection with a recovery line and hooking means which can be guided by the line follower in sliding movement down the guide line for hooking on to the catcher 5 in a recovery operation (see FIG. 6). In another embodiment the hooking means may be integrated in the line follower. From the guide line storage 9 to the snap link 10, the guide line 6 can be routed under the catcher 5 as previously mentioned.

Obviously, the line follower can optionally be used for guiding other equipment than hooks or grapnels down the guide line 6 to the submerged object, such as a camera for inspection of the object to be retrieved.

In the illustrated embodiment, the components for activation of the retrieval system of the present invention are installed inside the flexible skin of a bladder 7, in inflated state floating on the surface as a marker buoy. The bladder 7 is a gas-tight and hermetically sealed element.

A gas release cartridge 15, which can be realized in the form of a pressurized gas container, an explosive powder charge or a combination thereof, is arranged inside the bladder 7 for inflation of the bladder. In an electrically powered embodiment shown in FIG. 3, an activation assembly includes a gas release mechanism 16 in the form of an electro-mechanic driver, a servo motor or a solenoid, an electric/electronic control circuit 17, an accumulator or battery 18, and an initiation device 19. The initiation device 19 may be powered from the battery 18. The components 16 to 19 of the electrically powered activation assembly are all installed inside the bladder 7.

The initiation device 19 may be realized in the form of an on/off switch, such as an electro-mechanical switch or a magnetic switch, provided under the skin of the bladder and activated mechanically and magnetically respectively from the outside of the bladder, to generate an activation signal for the above-mentioned control circuit 17.

In a preferred embodiment, the initiation device is realized in the form of a pressure sensor reacting to internal pressure inside the bladder and set to generate an activation signal when the retrieval system is submerged or reaches a certain depth, or when reaching a pre-determined pressure. In other words, water pressure is measured indirectly inside the bladder by direct measurement of the prevailing absolute pressure in a small amount of remaining air or gas which is trapped inside the bladder as the bladder is sealed after installation of the system components. To this purpose, a pressure sensor of the piezo-electric type is preferred.

The initiation device 19 may alternatively be realized in the form of a receiving acoustic modem arranged to generate an activation signal in response to a remote acoustic command from a sending acoustic modem. In yet another embodiment, the initiation device comprises a conductivity sensor detecting a change in conductivity in the internals of the bladder material, or a capacitance sensor detecting change in capacitance when the bladder is being submerged.

In the preferred embodiment, the initiation device 19 is operative for triggering a timer function/timer algorithm in the control circuit or circuit board 17 which can be set to generate the activation signal after a predetermined lapse of time. This timer function is resettable, so that in the course of normal operation or within the predetermined lapse of time, the timer function can be reset and the retrieval system deactivated until the next time of operation. The initiation device/timer function may be triggered onboard a vessel by means of e.g. a wireless signal (Bluetooth, Wi-Fi, e.g.), by remote control, by means of a magnet closing a magnetic/electric circuit of a magnetic switch arranged under the skin of the bladder, or a push button closing an electric circuit of an electro-mechanical switch arranged under the skin of the bladder, before submerging the object into the sea.

Without naming specific brands and trade names, system components are available on the market to meet the desired specifications. As a non-limiting example and guide for implementation, a suitable gas cartridge contains 16 g of $CO_2$, considered to be sufficient for full and complete inflation of a spherical bladder with an approximative volume of 8.3 litres at atmospheric pressure and 4 degrees Celsius expanding from approximately 1.4 litres when activated at 50 metres depth. The gas release mechanism 16 may be realized in the form of an electromagnetic device, servo motor or solenoid controlling a valve or punching needle to open the gas cartridge and release gas from the gas cartridge. The control circuit 17 comprises a switch that directs power from the battery 18 to the gas release mechanism 16 in response to an activation signal received from the initiation device 19, delayed or not delayed. In a typical application, the gas release mechanism 16, the control circuit 17 and the initiation device 19 can be powered from 3×AAA (LR03) 1.5-volts batteries 18 with a total capacity of 1.5 Ah.

In one embodiment (not illustrated) the initiation device comprises a trigger-wire that connects the object to a float and initiates activation of the retrieval system if the tethering rope between the object and the float, and in result of that also the trigger-wire is tightened and teared off. The trigger-wire may comprise an electrical or optical conductor integrated in the tethering rope.

In one embodiment, see FIG. 4, a chemically initiated activation assembly 19 comprises a spring-biased puncturing needle 20 which remains arrested by a latch 21 until a water-soluble delay charge 22 has decomposed sufficiently to release the latch by action of a spring member 23. The delay charge 22 may include a slowly decomposing material, such as a salt or microcrystalline cellulose, e.g., which is placed in a container 24 in which the delay charge is exposed to sea water. In this embodiment, the activation signal can be transferred to the latch by means of a receiver device inside the bladder, without physical penetration of the bladder wall.

In another embodiment, see FIG. 5, the gas release cartridge 15 is an explosive powder charge 25 which is activated by an electrically operated primer or detonator 26. In yet another embodiment, a powder charge 25 may be arranged for opening a compressed-gas container that inflates the bladder.

The bladder 7 can be made of synthetic material, such as polyvinyl chloride (PVC), polyurethane, or made of natural rubber, or made of a mixture of rubber and synthetics. A sealable opening 27 (see FIG. 3) may be arranged in the skin to provide access and installation of the internal components of the system. Alternatively, the components may be installed inside an open bladder which is then fused/welded together. The thickness of the skin of the bladder shall be dimensioned with respect to tear strength of the material so as to withstand the internal pressure that is generated by the gas release cartridge at a specified water depth, and of course also at atmospheric pressure when the inflated bladder floats on the surface as a marker buoy.

On its exterior, the bladder 7 may at least partially be covered with a material or a color of high visibility, such as a luminous material, a light reflective material or a radar reflective material, e.g., as indicated at 28 in FIG. 2. In one embodiment, an antenna and an RF transmitter/receiver, radar reflector or a transponder may be integrated with the bladder for facilitating tracking/tracing of lost objects also in darkness or in poor sight/bad weather conditions. The bladder advantageously carries printed or electronic information about that it is a lost object and/or about the object, and/or about the owner to the object, and/or handling instructions directed to the finder of the bladder. Upon inflation, the outer casing 1 is forced open by the expanding bladder 7. To this purpose a wall of the casing 1 may be formed with an indication of fracture (not shown in drawings). In another embodiment (illustrated in FIG. 3), a portion or lid of the casing may be disconnected and removed from a base member 1' which remains attached to the object. The disconnected portion may still be attached to the base member. In still other embodiment, the casing 1 comprises a hinged or otherwise movably/pivotably attached lid member and a snap-lock mechanism that permits repeated opening/closing of the casing.

Figure 6:
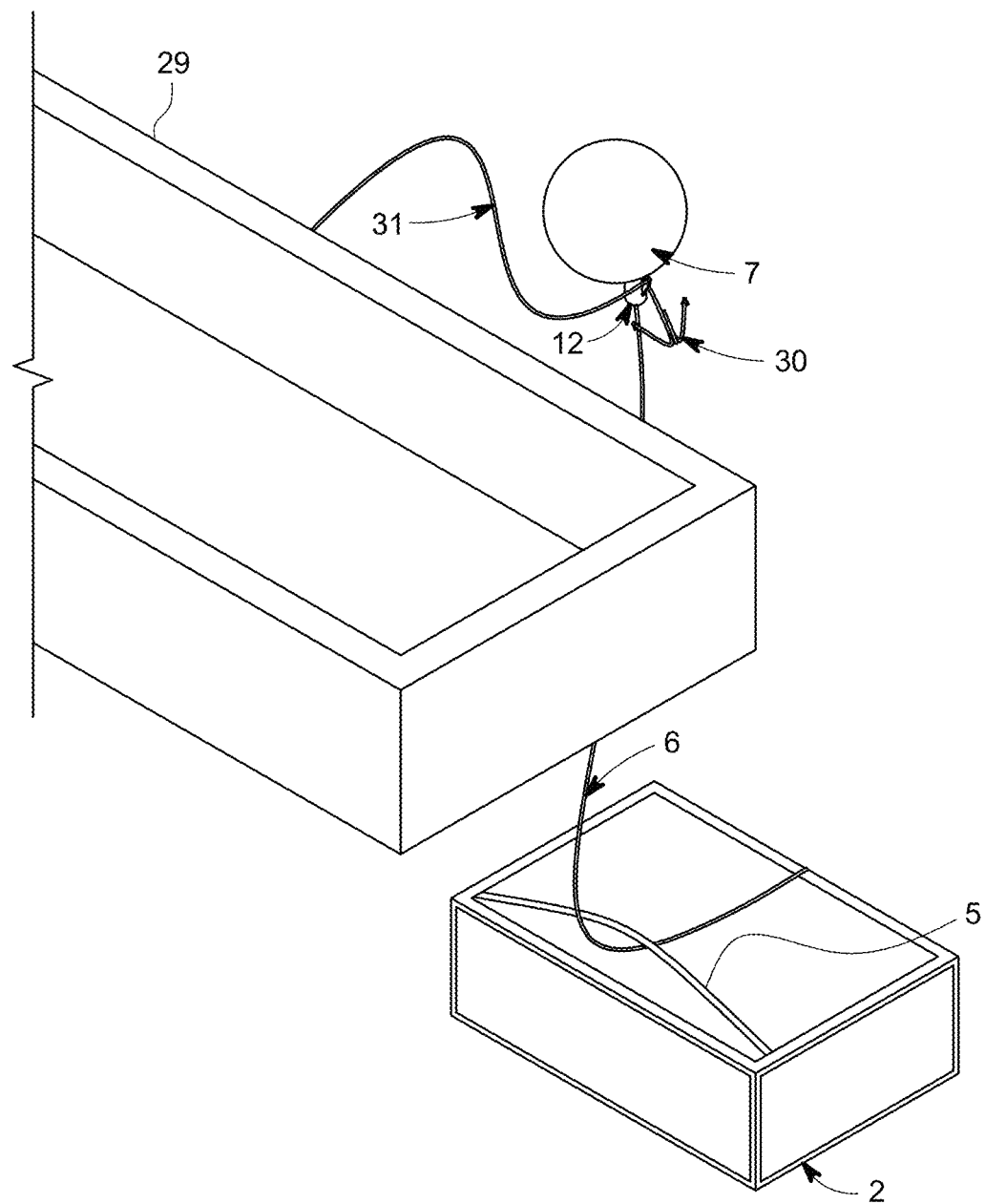
FIG. 6 is a cut-away view showing recovery of a submerged object using a surface vessel.

FIG. 6 illustrates schematically the recovery operation from a surface vessel 29 wherein a grapnel 30 in the end of a recovery line 31 is coupled to the line follower 12. In the following sequence the grapnel 30 will be guided down the guide line 6 until it reaches the object 2 for coupling with the catcher 5.

The retrieval system of the present invention is not to be limited for use with a trap, cage or other box-shaped object as illustrated: by applying general engineering skill the system may be adapted for implementation with objects of other shape and nature, such as fishing trawls, fishing nets, construction equipment, scooters and other surface vessels, cargo containers etc. Accordingly, in the claims, the invention is defined so as to incorporate every conceivable implementation which is mentioned herein, or is otherwise obvious, within the scope of the appended claims.

The invention claimed is:

1. A system arranged for retrieval of objects submerged and lost in water, the system comprising:
    an inflatable bladder, which in an inflated state forms a marker buoy;
    a gas release cartridge located inside the bladder;
    a gas release mechanism and a battery located inside the bladder, wherein the gas release mechanism is operated by battery power to release gas from the gas release cartridge;
    a control circuit located inside the bladder and arranged to route battery power to the gas release mechanism in response to an activation signal;
    an initiation device located inside the bladder and arranged for activation of the control circuit;
    a guide line with one end thereof connectable to a submerged object and the other end attached to the bladder, the guide line having a length sufficient to reach from the submerged object to the inflated bladder when the bladder is floating on the surface, the guide line operative for guiding a recovery means towards the submerged object from a surface vessel; and
    a non-watertight casing for housing the inflatable bladder, wherein at least the initiation device is in a state protected inside the non-watertight casing, such that upon inflation of the inflatable bladder the non-watertight casing is forced open by the inflatable bladder as it expands,
    wherein the initiation device is arranged to generate an activation signal in response to at least one of: indirectly detected water pressure, sensed conductivity or capacitance internally of the bladder, pulling of a trigger-wire, or received remotely sent acoustic command, and upon which the initiation device is operative for triggering a timer function in the control circuit which can be set to generate the activation signal after a predetermined lapse of time, and wherein the timer is arranged to be reset so as to deactivate the retrieval system within the predetermined lapse of time in the course of normal operation.

2. The system of claim 1, wherein the gas release cartridge is one of a pressurized gas container, an explosive powder charge, or a combination thereof.

3. The system of claim 1, wherein an activation assembly, installed inside the bladder, wherein the activation assembly is electrically powered and comprises at least one of a timer, a switch, a pressure sensor, a conductivity sensor, a capacitance sensor, an acoustic modem, a primer, or any combination thereof.

4. The system of claim 3, wherein the activation assembly comprises one of a solenoid or a servo motor installed inside the bladder.

5. The system of claim 4, wherein the activation assembly comprises a valve or punching needle.

6. The system of claim 1, wherein the initiation device comprises one or more of: a timer, a switch, a pressure sensor, a conductivity sensor, a capacitance sensor, a primer, a trigger-wire, or a wireless device.

7. The system of claim 6, wherein the timer is arranged in the control circuit or in a microprocessor of the control circuit.

8. The system of claim 1, further comprising a line follower pre-installed on the guide line and detachably connected to the bladder.

9. The system of claim 8, wherein the line follower is made of buoyant material and arranged to slide on the guide line.

10. The system of claim 8, wherein the line follower has a coupling eye formed in a bracket on the exterior of the line follower, providing connection with a recovery line and hooking means which can be guided by the line follower in sliding movement down the guide line for hooking on to a catcher member in a recovery operation.

11. The system of claim 1, comprising a catcher member connectable to the submerged object.

12. The system of claim 11, wherein the catcher member is a wire, band or rope.

13. The system of claim 11, wherein the catcher member is set in a coupling position by engagement with the guide line as the inflated bladder is rising to the surface, or as the guide line is being stretched in a retrieval operation.

14. The system of claim 1, wherein the bladder comprises or includes a luminous material, a light reflective material, or a radar reflective material.

15. The system of claim 1 further comprising a transponder located in or connected to the inflatable bladder.

16. The system of claim 1, wherein the bladder comprises printed or electronic information relating to the submerged object, and that the submerged object is a lost object.

17. The system of claim 1, wherein the switch is one of a magnetic or an electro-mechanical switch.

18. The system of claim 1, wherein the wireless device is one of a Wi-Fi, Bluetooth or an acoustic modem.

19. The system of claim 11, wherein the catcher member is a wire, band or rope made of buoyant material.

* * * * *